(12) United States Patent
Kozutsumi

(10) Patent No.: US 8,222,317 B2
(45) Date of Patent: Jul. 17, 2012

(54) WET FRICTION MATERIAL

(75) Inventor: Toshihiko Kozutsumi, Isesaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 12/740,274

(22) PCT Filed: Oct. 2, 2008

(86) PCT No.: PCT/JP2008/067895
§ 371 (c)(1),
(2), (4) Date: Apr. 28, 2010

(87) PCT Pub. No.: WO2009/057414
PCT Pub. Date: May 7, 2009

(65) Prior Publication Data
US 2010/0256259 A1 Oct. 7, 2010

(30) Foreign Application Priority Data
Oct. 29, 2007 (JP) ................................. 2007-280727

(51) Int. Cl.
*C08J 5/14* (2006.01)
(52) U.S. Cl. ......... 523/149; 523/152; 523/155; 523/156
(58) Field of Classification Search .................. 523/149, 523/152, 155, 156
See application file for complete search history.

(56) References Cited

U.S. PATENT DOCUMENTS

| 6,451,872 | B1 * | 9/2002 | Yamane | ........................ 523/156 |
| 2006/0019085 | A1 * | 1/2006 | Lam et al. | .................. 428/304.4 |

FOREIGN PATENT DOCUMENTS

| JP | 64-069832 A | 3/1989 |
| JP | 09-194822 A | 7/1997 |
| JP | 09-217054 A | 8/1997 |
| JP | 2006-199777 A | 8/2006 |
| WO | WO 2007044889 A2 * | 4/2007 |

OTHER PUBLICATIONS

Machine translation of JP 2006-199777 A, Aug. 3, 2006.*

* cited by examiner

*Primary Examiner* — Vickey Nerangis
(74) *Attorney, Agent, or Firm* — Sughrue Mion, PLLC

(57) ABSTRACT

The purpose of the present invention is to provide a wet friction material which has a high coefficient of friction, has reduced overall thickness change, and excellent heat resistance (resistance to heat spots). In order to accomplish the purpose, the present invention provides a wet friction material prepared by impregnating a base material including a fibrous substance with a thermosetting resin, and then thermally curing it, wherein the aspect ratio of the fibrous substance is 10 or higher, and the fibrous substance is contained in the base material in an amount of 60 to 75 weight %.

3 Claims, No Drawings

WET FRICTION MATERIAL

CROSS REFERENCE TO RELATED APPLICATIONS

This application is a National Stage of International Application No. PCT/JP2008/067895 filed Oct. 2, 2008, claiming priority based on Japanese Patent Application No. 2007-280727, filed Oct. 29, 2007, the contents of all of which are incorporated herein by reference in their entirety.

TECHNICAL FIELD

The present invention relates to a wet friction material used in an oil, especially an ATF (an automatic transmission fluid).

BACKGROUND ART

In general, a multi-plate clutch in which a plurality of friction plates comprising a metal substrate (a core plate) with a wet friction material adhered to the surface thereof, and separator plates comprising a single plate such as a metal plate or the like as a friction mating material are alternatively positioned is integrated in automotive automatic transmissions, and the driving force is transmitted or interrupted by pressure contact or release of these plates to each other in the ATF used as a lubricant.

Rubber-based friction materials and so-called paper friction materials comprising paper as a base are used as wet friction materials. Paper friction materials are generally produced by mixing various friction modifiers or the like with pulp, then performing wet papermaking, and next, impregnating the resulting material with a binding resin such as a phenol resin, followed by curing. Paper friction materials have a high dynamic friction coefficient.

The automotive industry has recently been advancing weight reduction and high efficiency in various parts in the pursuit of energy efficiency and reduced weight. On the other hand, there is a tread for higher revving and higher power output of automobile engines. In automatic transmissions as well, friction materials having improved friction coefficients, heat resistance, and durability are desired in order to respond to the higher revving and higher output of automobile engines.

Namely, wet friction materials with a high heat resistance at high temperatures and high-load conditions have been sought, and there is also a strong demand for even greater improvements in high friction coefficients.

In order to improve on these problems, trials to increase the strength of a material using a nonwoven fabric were made for a wet friction material described in Patent Document 1, for example. However, this has drawbacks in that the base material per se is expensive, and in that the friction coefficient thereof is gradually reduced during use because only the friction modifier per se adheres to the surface thereof, and the adhesion strength itself is not very strong. In addition, Patent Document 2 proposed a process comprising a step of impregnation with a thermosetting resin in which fine particles of a mesophase pitch are mixed and dispersed, followed by a step of processing at a high temperature to carbonize the mesophase pitch and the thermosetting resin to prepare the base paper material, whereby high strength and porosity can be maintained. However, friction materials prepared by these processes have a remarkably reduced friction coefficient, compared with general paper friction materials.

Carbon ingredients are useful substances to control the frictional force, and may be used in various forms.

Patent Document 3 describes a friction material using carbon nanofibers. It also describes the use thereof for clutch facings and the like as well as disc brakes for cars. Further, it describes improved rotational fracture strength as the effect of the friction material. Therefore, the technical content of Patent Document 3 is different from that of the present invention which is aim at improving the high friction coefficient and heat resistance (heat spotting resistance) of a friction material used in an oil.

Patent Document 1: Japanese Patent Laid-open No. 2004-217790
Patent Document 2: Japanese Patent Laid-open No. 11-5850
Patent Document 3: Japanese Patent Laid-open No. 2004-217828

DISCLOSURE OF THE INVENTION

Problems to be Solved by the Invention

The object of the present invention is to provide a wet friction material having a high friction coefficient, a small change in the total thickness of the friction material, and excellent heat resistance (heat spotting resistance).

Means for Solving the Problems

As a result of keenly studying to solve the above problems, the inventors of the present application found that heat resistance is remarkably increased by using a fibrous substance having an aspect ratio of 10 or higher, and adding this to the wet friction material in an amount of 60 to 75 weight %.

Namely, the present invention relates to (1) a wet friction material prepared by impregnating a base material comprising a fibrous substance with a thermosetting resin, and then thermally curing same, wherein the aspect ratio of the fibrous substance is 10 or higher, and the fibrous substance is contained in the base material in an amount of 60 to 75 weight %, (2) the wet friction material as described in (1), wherein the fibrous substance is selected from cellulose, metal fibers, ceramic fibers, aramid fibers, fibrous carbon, or mixtures thereof, and (3) the wet friction material as described in (2), wherein the fibrous carbon is selected from carbon nanotubes, carbon nanofibers, vapor-deposited carbon fibers and mixtures thereof.

Effect of the Invention

The present invention can provide a friction material excellent in heat resistance without burning spots called heat spots on the surface of the friction mating plate because the base material of the wet friction material comprises 60 to 75 weight % of a fibrous substance having an aspect ratio of 10 or higher. Further, this friction material has effects that there is no reduction of the dynamic friction coefficient, as well as reduced wear volume.

BEST MODE FOR CARRYING OUT THE INVENTION

In the present invention, a fibrous substance having an aspect ratio of 10 or higher is used. The aspect ratio described herein means fiber length/fiber diameter. The aspect ratio can be measured by a flow system image analyzing method using a grain size distribution image analyzer (for example, Rapid-VUE; manufactured by BECKMAN COULTER CORPORATION), electron micrograph and the like.

The aspect ratio of the fibrous substance used in the present invention is 10 or higher, preferably 50 or higher.

As the aspect ratio is 10 or higher, a stronger base material can be formed, resulting from the affinity, and the formation of physical crosslinking with other materials, whereby durability can be remarkably improved.

Although the upper limit of the aspect ratio is not particularly limited, as far as it is 10 or higher, the aspect ratio is 25000 or less, preferably 5000 or less, considering the production of fibrous substance or the availability thereof.

In addition, the average fiber length of the fibrous substance is generally 1 to 3000 μm, preferably 10 to 800 μm.

The fibrous substance used in the present invention is used as the base material of the wet friction material. As such fibrous substances, although those normally used in the technical field of the present application can be used, specific examples thereof include cellulose, metal fibers, ceramic fibers, aramid fibers, fibrous carbon, or mixtures thereof. In addition, it is preferable that fibrous carbon is added to the base material of the wet friction material. Carbon nanotubes, carbon nanofibers, vapor-deposited carbon fibers, and mixtures thereof are preferably used as the fibrous carbon. Fibrous carbon is excellent as a friction material because it has a significant heat releasing effect.

It is effective that the base material of the wet friction material of the present invention comprises the above fibrous substance in the extremely limited range of 60 to 75 weight %. If the ratio of the fibrous substance is less than 60%, the strength of the whole friction base material is reduced, and heat resistance and durability are reduced because the ratio of the powder ingredients is increased.

Also, if the ratio of the fibrous substance is more than 75%, the strength of the base material per se is increased, while the friction coefficient is reduced, and the wear volume is increased, due to the action that heat generated by friction cannot be eliminated because the ratio of the substance to control the friction force is reduced.

The base material of the present invention comprises a powder filler as well as the above fibrous substance. Inorganic powder fillers such as diatom earth, activated carbon, graphite, and molybdenum disulfide, and organic powder fillers such as cashew dust, fluorinated resin powders, and spherical phenol resin cured products are exemplified as the powder fillers. They may be used alone or in combination of two or more thereof. These substances function as friction modifiers in the wet friction materials, and function to increase or decrease the friction coefficient.

These powder fillers are spherical powders having an aspect ratio of less than 10, and are distinguished from the above fibrous substance. The powder filler is contained in the base material of the present invention in an amount of 25 to 40 weight %.

A publicly known thermosetting resin used in a wet friction material may be used as the thermosetting resin used in the present invention. Examples thereof include phenol resins, modified phenol resins reformed with an oil, a rubber, an epoxy resin or the like, melamine resins, epoxy resins, polyimide resins, unsaturated polyester resins and the like. They may be used alone or in combinations of two or more thereof. Among them, phenol resins and modified phenol resins are preferable, and resol-type phenol resins are especially preferable.

The amount of the impregnated thermosetting resin is 20 to 50 parts by weight, preferably 30 to 40 parts by weight with respect to 100 parts by weight of the base material.

The method for preparing the base material of the wet friction material of the present invention is not particularly limited. For example, a method for preparing a base material comprising drying paper prepared from a slurry of a mixture of a fibrous substance such as cellulose, aramid fibers or the like with a powder filler such as diatomaceous earth or the like dispersed in water may be used.

EXAMPLES

Example 1

To 40 parts by weight of cellulose pulp, 15 parts by weight of aramid pulp, 3 parts by weight of VGCF (registered trademark) (vapor-deposited carbon fibers having an aspect ratio of 10 to 500, manufactured by SHOWA DENKO K.K.), 5 parts by weight of KYNOL carbon fiber (having an aspect ratio of 20 to 100, manufactured by NIPPON KYNOL INC.), 27 parts by weight of diatomaceous earth (a powder having an aspect ratio of 10 or less), and 10 parts by weight of activated carbon (a powder having an aspect ratio of 10 or less) were mixed, and were subjected to a papermaking process to prepare a friction base material.

The substances having an aspect ratio of 10 or higher accounted for 63 weight % of the whole friction base material.

Next, the commercially available phenol resin BKS-2700 (manufactured by SHOWA HIGHPOLYMER CO., LTD.) was impregnated in the paper base material such that it accounted for 40 parts by weight with respect to 100 parts by weight of the paper base material, and was cured at 220° C. for ten minutes. Further, ring-shape articles were punched out from this sheet-shape interim product using a pressing machine and a mold. An adhesive was coated on both surfaces of a separately prepared ring-shape core iron plate, and was dried at 60° C. for 20 minutes. The ring-shape articles were bonded to both surfaces of the ring-shape core iron plate onto which the adhesive was coated, and were subjected to hot press bonding at 250° C. for three minutes at an actual area pressure of 200 kg/cm$^2$ to prepare a wet friction material plate.

The friction properties of this wet friction material plate were measured by an SAE#2 testing machine, and delamination strength was repeatedly measured by a compression testing machine. The measurement conditions are shown in Table 1.

TABLE 1

| Items | Conditions |
| --- | --- |
| Number of friction plates | 1 |
| Number of friction mating plates | 2 |
| Surface pressure | 8.0 kg/cm$^2$ |
| Oil temperature | 100° C. |
| Revolutions | 3600 rpm |
| Inertia | 0.0150 kg · m · sec$^2$ |
| Driving system | Inertial absorption |
| Number of cycles | 5000 cycles |
| Oil used | DEXII type ATF |

In the friction test, after the motor was revved at 3600 rpm for 20 seconds, the clutch was engaged, inertia was absorbed to stop for ten seconds, and the friction coefficient at revs of around 1800 rpm was defined to be the dynamic friction coefficient, and the value thereof was evaluated. After repeating this cycle 200 times, the dynamic friction coefficient was measured to be 0.135. No burn spotting called heat spots was observed on the surface of the friction mating plate at this time. The wear volume was extremely small, i.e., 3 μm. Further, the wear volume generated after the number of cycles was increased to 5000 was small, i.e., 8 μm, and no heat spots were observed on the surface of the friction mating plate. The friction coefficient at this time was 0.133, and there was little change in friction coefficient from the previous test.

Examples 2 and 3

The same procedure was repeated as in Example 1, except that the composition shown in Table 2 was used. In the result of the friction test, an excellent friction coefficient could be maintained, the wear volume was small, and no heat spots were observed.

Comparative Examples 1 and 2

The same procedure was repeated as in Example 1, except that the composition shown in Table 2 was used. As a result, regarding Comparative Example 1 which was an example of a general friction material composition, heat spots were observed on the friction mating plate after a 5000 cycle repeat test was performed, and the wear volume was remarkably increased to 60 μm.

Further, regarding Comparative Example 2, when the ratio of the fibers in the friction base was increased to 80%, the friction coefficient was remarkably reduced, and heat spots were formed.

TABLE 2

|  |  |  | Example 1 | Example 2 | Example 3 | Compar. Example 1 | Compar. Example 2 |
|---|---|---|---|---|---|---|---|
| Friction base composition (parts by weight) | Cellulose pulp | Aspect ratio 200 to 20000 | 40 | 40 | 25 | 40 | 50 |
|  | Aramid pulp | 200 to 20000 | 15 | 15 | 40 | 15 | 30 |
|  | VGCF | 10 to 500 | 3 | 5 | 5 | — | — |
|  | KYNOL | 20 to 100 | 5 | — | — | — | — |
|  | Diatom earth | About 2 | 27 | 30 | 20 | 30 | 10 |
|  | Activated carbon | About 4 | 10 | 10 | 10 | 15 | 10 |
| evaluation | At 200 cycles | Dynamic friction coefficient | 0.135 | 0.133 | 0.138 | 0.133 | 0.107 |
|  |  | Wear volume (μm) | 3 | 5 | 4 | 15 | 40 |
|  |  | Presence of heat spots | No | No | No | No | Yes |
|  | At 5000 cycles | Dynamic friction coefficient | 0.133 | 0.132 | 0.136 | 0.128 | 0.105 |
|  |  | Wear volume (μm) | 8 | 16 | 7 | 60 | 150 |
|  |  | Presence of heat spots | No | No | No | Yes | Yes |

The invention claimed is:

1. A wet friction material prepared by impregnating a base material comprising a fibrous substance with a thermosetting resin, and then thermally curing same, wherein the aspect ratio of the fibrous substance is 10 or higher, and the fibrous substance is contained in the base material in an amount of 60 to 75 weight %, provided that the fibrous substance comprises at least 3 weight % of fibrous carbon selected from the group consisting of carbon nanotubes, carbon nanofibers, vapor-deposited carbon fibers, and mixtures thereof in the base material.

2. The wet friction material according to claim 1, wherein the fibrous substance is selected from the group consisting of cellulose, metal fibers, ceramic fibers, aramid fibers, fibrous carbon, and a mixture thereof.

3. The wet friction material according to claim 2, wherein the fibrous substance is fibrous carbon.

* * * * *